(12) United States Patent
Bosnar

(10) Patent No.: US 7,919,964 B2
(45) Date of Patent: Apr. 5, 2011

(54) COMBINED ELECTROMAGNETIC SENSOR AND MAGNETOMETER

(75) Inventor: Miroslav Bosnar, Toronto (CA)

(73) Assignee: Geonics Limited, Mississauga, Ontario (CA)

( * ) Notice: Subject to any disclaimer, the term of this patent is extended or adjusted under 35 U.S.C. 154(b) by 430 days.

(21) Appl. No.: 12/131,498

(22) Filed: Jun. 2, 2008

(65) Prior Publication Data

US 2009/0295391 A1    Dec. 3, 2009

(51) Int. Cl.
*G01V 3/08*    (2006.01)
*G01N 27/72*    (2006.01)
*G01R 33/12*    (2006.01)

(52) U.S. Cl. ........................... 324/326; 324/239

(58) Field of Classification Search .......... 324/228, 324/234, 239, 243, 207.26, 326, 327, 328, 324/329, 330, 332, 344, 345; 340/551
See application file for complete search history.

(56) References Cited

U.S. PATENT DOCUMENTS

| | | | |
|---|---|---|---|
| 4,255,711 A * | 3/1981 | Thompson | ..................... 324/329 |
| 4,963,789 A | 10/1990 | Buhler | |
| 5,465,012 A | 11/1995 | Dunnam | |
| 6,064,209 A * | 5/2000 | Banerjee | ..................... 324/329 |
| 6,100,696 A | 8/2000 | Sinclair | |
| 6,731,968 B2 | 5/2004 | Buchanan | |
| 6,967,574 B1 * | 11/2005 | Nelson | ..................... 340/551 |
| 7,203,599 B1 | 4/2007 | Strack et al. | |
| 2008/0136408 A1 * | 6/2008 | Andra et al. | ..................... 324/239 |

OTHER PUBLICATIONS

Geonics Limited, "Mapping Systems—Metal Detectors", published as early as 2006.

* cited by examiner

*Primary Examiner* — Kenneth J Whittington
(74) *Attorney, Agent, or Firm* — Fay Sharpe LLP

(57) ABSTRACT

A combined electromagnetic and magnetometer detection system for detecting objects. The system includes a primary electromagnetic transmitter for generating a primary magnetic field; an electromagnetic sensor for sensing secondary magnetic fields generated by a target region subjected to the primary magnetic field; a magnetometer sensor substantially centered at a center of the primary magnetic field; a compensation transmitter for generating a compensating magnetic field that substantially negates the primary magnetic field across the magnetometer sensor; and a signal generator electrically connected to the primary electromagnetic transmitter and the compensation transmitter for driving the transmitters to generate the primary magnetic field and the compensating magnetic field, respectively.

18 Claims, 5 Drawing Sheets

COMBINED ELECTROMAGNETIC SENSOR AND MAGNETOMETER

BACKGROUND

Embodiments described herein relate to a device and method for detecting metal and other ferrous and non-ferrous objects, and, in particular, to a device and method for detection of objects using electromagnetic sensing as well as ambient magnetic field detection.

Various techniques have been developed for sensing ferrous and non-ferrous objects, such as unexploded ordnances (UXO), on or under the ground. One of these techniques involves the use of a magnetometer to detect the distortion of an ambient magnetic field caused by ferrous objects. Another technique involves the active use of an electromagnetic field transmitter and an induction sensor, using the transmitter as an electromagnetic pulse generator and reading the inductive response of nearby objects using the sensor. Each of these techniques has strengths and drawbacks: while a magnetometer is effective at a relatively great distance, a pulse induction sensor is more adept at sensing closer, smaller objects and at sensing non-ferrous objects.

As each of the two techniques have different advantages and disadvantages, it is desirable to use both techniques to survey an area.

SUMMARY

According to one aspect there is provided a combined electromagnetic and magnetometer detection system for detecting objects. The system includes a primary electromagnetic transmitter for generating a primary magnetic field; an electromagnetic sensor for sensing secondary magnetic fields generated by a target region subjected to the primary magnetic field; a magnetometer sensor substantially centered at a center of the primary magnetic field; a compensation transmitter for generating a compensating magnetic field that substantially negates the primary magnetic field across the magnetometer sensor; and a signal generator electrically connected to the primary electromagnetic transmitter and the compensation transmitter for driving the transmitters to generate the primary magnetic field and the compensating magnetic field, respectively.

According to another aspect, there is provided a combined electromagnetic and magnetometer detection system for detecting objects. The system includes a primary transmitter coil for generating a primary magnetic field, the primary transmitter coil having a central primary transmitter coil dipole axis; a sensor coil for sensing secondary magnetic fields generated by target regions subjected to the primary magnetic field; a magnetometer sensor substantially centered on the primary transmitter coil dipole axis; a compensation coil for generating a compensating magnetic field that substantially negates the primary magnetic field across the magnetometer sensor, the compensation coil being smaller than the primary transmitter coil and having a central compensation coil dipole axis extending substantially along the primary transmitter coil dipole axis; and a signal generator electrically connected to the primary transmitter coil and the compensation coil for driving the coils to generate the primary magnetic field and the compensating magnetic field, respectively.

According to another aspect, there is provided a method for detecting unexploded ordinance, including: providing a detection system that includes: (i) a primary coil for generating a primary magnetic field, the primary coil having a central primary coil dipole axis; (ii) a sensor coil for sensing secondary magnetic fields generated by target regions subjected to the primary magnetic field; (iii) a magnetometer sensor substantially centered on the primary coil dipole axis; and (iv) a compensation coil for generating a compensating magnetic field that substantially negates the primary magnetic field across the magnetometer sensor, the compensation coil being smaller than the primary coil and having a central compensation coil dipole axis extending substantially along the primary coil dipole axis; generating a pulsed signal to drive the primary coil and the secondary to produce the primary magnetic field and the compensating magnetic field, respectively; measuring, though the sensor coil, secondary magnetic field information generated by a target region subjected to the primary magnetic field; measuring, through the magnetometer sensor, magnetic field information in the target region; and processing the measured information to detect unexploded ordinance in the target region.

According to another aspect is an apparatus for detecting ferrous and non-ferrous objects using a pulse induction sensor and a magnetometer. The apparatus includes a pulse induction sensor, a magnetometer, a primary electromagnetic pulse transmitter coil, and a compensation coil for canceling out the effects of the primary transmitter coil so as to allow the magnetometer to operate while the primary transmitter coil is active. The compensation coil is nested within the primary transmitter coil, producing a point at the center of both coils where the electromagnetic fields generated by both coils cancel each other out. The magnetometer operates at this point. This placement provides maximal cancellation of the field produced by the primary transmitter coil and allows the magnetometer and the transmitter coil to be placed close together within the apparatus. The electromagnetic sensor coil operates directly inside the primary transmitter coil.

BRIEF DESCRIPTION OF THE DRAWINGS

Example embodiments are described below with reference to the following accompanying drawings:

FIG. 6b is an enlarged portion of graph of FIG. 6a.

FIG. 7b is an enlarged portion of graph of FIG. 7a.

DETAILED DESCRIPTION OF EXAMPLE EMBODIMENTS

As noted above, one technique for finding unexploded ordinances and other object of interest involves the use of a magnetometer to detect the distortion of an ambient magnetic field caused by ferrous objects. Another technique involves the active use of an electromagnetic field transmitter and an induction sensor, using the transmitter as an electromagnetic pulse generator and reading the inductive response of nearby objects using the sensor. As indicated above, each of these techniques has strengths and drawbacks, and thus a field survey using both techniques is desirable. However, the simultaneous use of a both techniques presents design limitations, as the active operation of an electromagnetic pulse transmitter can interfere with a magnetometer's readings. According to example embodiments of the invention, as described in greater detail below, one way to reduce interference is to use a compensation transmitter coil to cancel the effects of the electromagnetic pulse transmitter.

A compensation coil to cancel the effect of a primary EM pulse transmitter coil can be used, and may for example involve a configuration in which the compensation coil is spaced away from the primary EM pulse coil, and the magnetometer is even farther away at a point where the strength of the two magnetic fields produced by the two coils is equal.

In example embodiments of the present invention as described below, a different configuration is employed in that the compensation coil and the magnetometer are instead nested inside the transmitter coil. In at least some applications, such a configuration can resulting in a more uniformly nullified field and a more compact device than when the compensation coil and magnetometer are located spaced apart from the primary transmitter coil.

Figure 1:
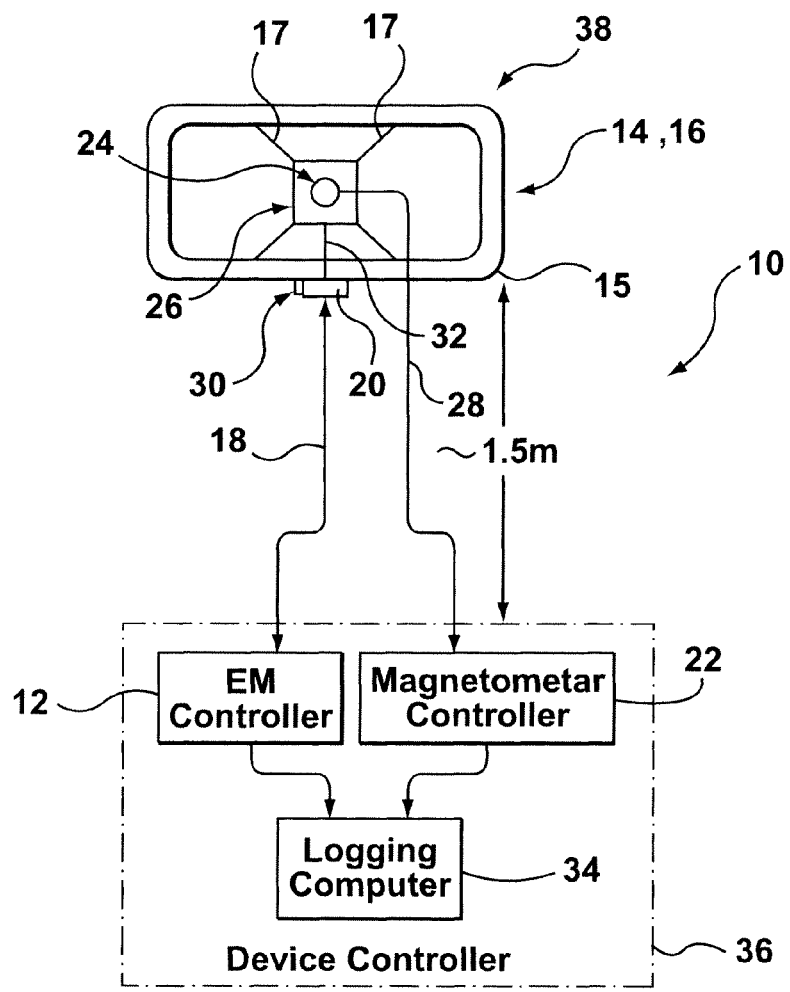
FIG. 1 is a block diagram representing a combined magnetometer and electromagnetic sensor according to an example embodiment.

Referring to FIG. 1, there is illustrated a combined EM sensor and magnetometer device 10 according to an example embodiment of the invention. The combined device 10 is configured for on-ground or submersible detection of ferrous and non-ferrous objects, and includes an EM pulse sensor for detecting the secondary electromagnetic field created by nearby objects in response to an electromagnetic pulse, and a magnetometer for detecting perturbations in the ambient magnetic field caused by nearby objects.

The EM pulse sensor of combined device 10 includes an EM controller 12 which is connected to a primary EM pulse transmitter coil 14 and an EM pulse sensor or receiver coil 16. The magnetometer includes a magnetometer controller 22 and a magnetometer sensor 24. The combined device 10 also includes a back-out or compensation coil 26. The EM transmitter coil 14, receiver coil 16, magnetometer sensor 24 and compensation coil 26 collectively are part of a transmitter and sensor assembly 38, and the EM controller 12 and magnetometer controller 22 are part of a device controller 36. The device controller 36 may also include a logging computer 34 for receiving and storing field survey data from both the EM controller 12 and magnetometer controller 22. In the illustrated embodiment, electrical cables 18, 28 connect the EM controller 18 to the EM transmitter and receiver coils 14, 16, and magnetometer controller 22 to the magnetometer sensor 24, respectively. A further electrical connection 32 connects the compensation coil 26 to the electrical cable 18 at an interconnection box 30 so the compensation coil 26 can receive pulses generated by the EM controller 12.

Figure 3:
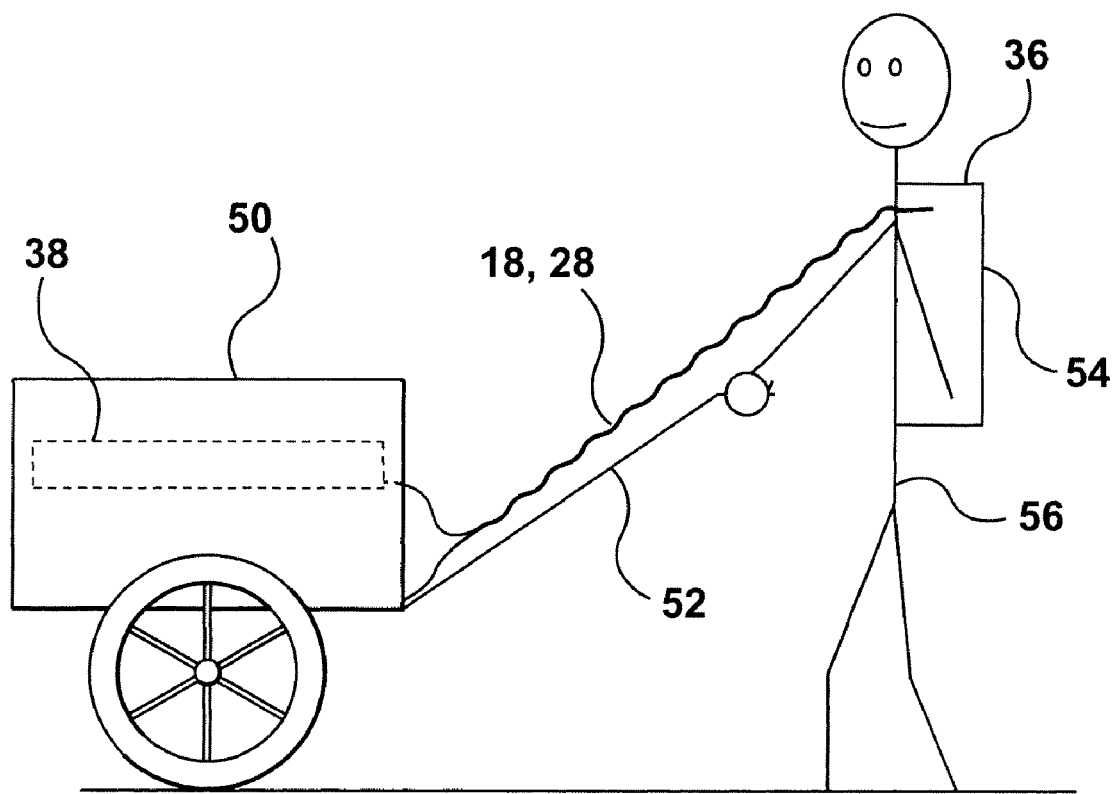
FIG. 3 is a schematic representation of one possible transport platform for the combined sensor of FIG. 1.

As shown in FIG. 3, in at least one example embodiment, the transmitter and sensor assembly 38 is mounted to a wheeled push cart 50 that has a push handle 52 such that an operator 56 can push the cart 50 around a survey site and maintain the sensor assembly 38 at approximately a consistent distance from the ground being surveyed. In the illustrated example, the device controller 36 is mounted to a backpack frame 54 for carrying on the operator's back, with cables 18, 28 (which can also be multiple conductors in a single cable) extending from the device controller 36 to the transmitter and sensor assembly 38. In one example embodiment, the handle 52, cart 50 and cables 18, 28 are configured so that the device controller is horizontally separated from the closest part of the transmitter and sensor assembly 38 by approximately 1.5m to militate against noise being introduced to sensors 16, 24 by the device controller 36 circuitry. The cart configuration shown in FIG. 3 is provided as a non-limiting example of one of many possible physical configurations for combined device 10. In alternative embodiments, for example the combined device could be mounted to or integrated into a motorized vehicle. Such vehicle for example could be a land vehicle such as a truck or tracked vehicle or a water based vehicle such as a boat or submarine.

The pulse EM induction sensor and the magnetometer operate using detection principles that are generally known in the art. In particular, the EM controller 12 includes an electrical pulse generator 40 (shown in FIG. 2) that applies pulses that are one or both of periodic and time varying to the EM transmitter coil 14. The pulse induction sensor coil 14 senses the resulting secondary magnetic field generated by the terrain and objects on or embedded in the terrain, allowing the EM controller 12 to detecting the rate of decay of the magnetic field produced by nearby objects in response to the electromagnetic pulses generated by the transmitter coil 14. Different rates of decay of this field indicate different inductive properties of nearby objects. The field magnetometer operates by detecting through magnetometer sensor 24 the variations in the ambient magnetic field produced by nearby objects.

In order for the magnetometer sensor 24 to operate accurately, it is desirable to measure the ambient magnetic field without interference from additional sources of electromagnetism, including the EM transmitter coil 14. According to example embodiments, the compensation coil 26 is used to cancel the effects of the field generated by the primary EM transmitter coil 14 at the location in space where the magnetometer sensor 24 resides. The compensation coil 26 is smaller in size than the primary transmitter coil 14 and is nested inside of the EM transmitter coil 14 to produce a canceling magnetic field whose gradient in space at the centrally located magnetometer sensor 24 closely matches that of the active magnetic field produced by the EM transmitter coil 14.

In one example embodiment, the transmitter and sensor assembly 38 is configured so that during operation the compensation coil 26 and EM pulse transmitter coil 14 are each substantially horizontally oriented with a substantially vertical central dipole axis, with both coils 26 and 14 centered at the same point. The magnetometer sensor 24 is located at this center point. In at least one example embodiment, the EM pulse receiver coil 16 is coincident with the EM pulse transmitter coil 14. In one non-limiting example, the EM pulse receiver coil 16 and the EM pulse transmitter coil 14 are each horizontally wrapped around a rigid rectangular frame 15, with the compensation coil 26 being secured to the frame 15 by rigid joining members 17, and magnetometer sensor 24 secured within the compensation coil 26. In one non-limiting example embodiment, rectangular frame 15 is approximately 1.0 m by 0.5 m, however other frame shapes and sizes and support structures can be used to implement the transmitter and sensor assembly 38.

Figure 4:
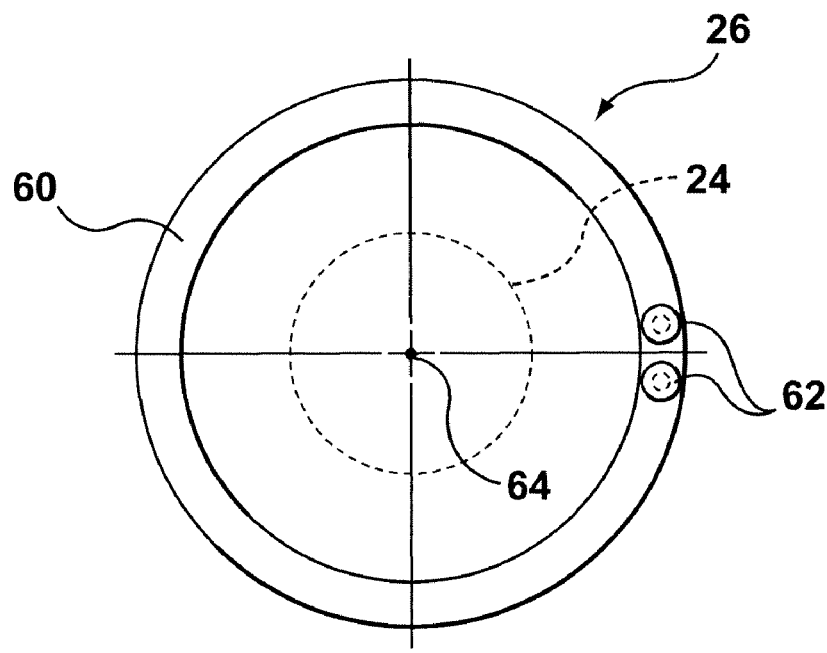
FIG. 4 is a plan view of a compensation coil according to an example embodiment, for use in the sensor of FIG. 1.
Figure 5:
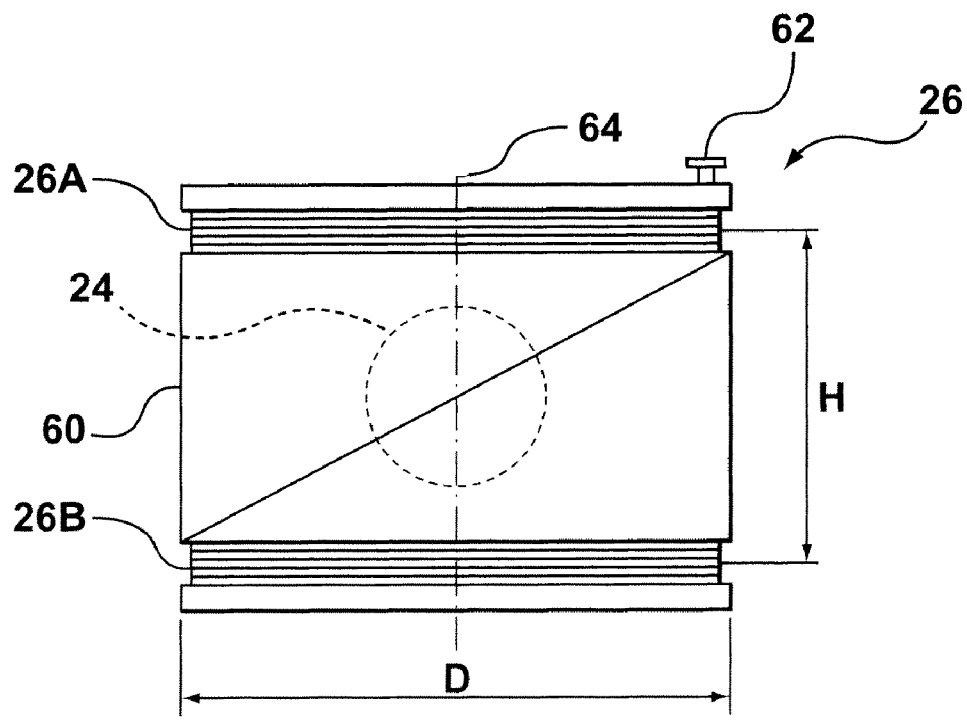
FIG. 5 is a side elevation of the compensation coil of FIG. 4.

In example embodiments, the compensation coil 26 comprises multiple coils sections that are axially spaced from each other and wound in sequence around a cylindrical core. An example embodiment of a compensation coil 26 that can be used in the detector 10 of FIG. 1 is illustrated in FIGS. 4 and 5 in which the compensation coil 26 includes a cylindrical coil former or core 60 wound with two serially connected coil sections 26A and 26B, with one coil section 26A horizontally wound about a top portion of the core 60 and the second coil section 26B horizontally wound at a bottom portion of the core 60. As illustrated in phantom lines, the magnetometer sensor 24 is located at the center of the cylindrical core 60, at the midpoint between the axially spaced upper and lower coil sections 26A, 26B. In particular, in the illustrated embodiment, the magnetometer sensor 24 is horizontally centered on the common dipole axis 64 of the upper and lower coil sections 26A and 26B, and vertically centered at the vertical mid-point between the upper and lower coil sections 26A and 26B. Such a compensation coil configuration is configured to provide uniform field cancellation over the entire area of the magnetometer sensor 26 in cases where the area of the magnetometer sensor 26 is significant relative to the spatial gradients of the magnetic fields. Connection terminals 62 can be provided on the cylindrical core 62 for electrically connecting the coils sections 26A and 26B to electrical connector 32. In one non-limiting example, the coil sections 26A and 26B each have approximately 8 turns, each have a diameter D of approximately 20 cm, and are axially separated approximately 10.6 cm. The magnetometer sensor 24 is small in size relative to the diameter of the compensation coil 26 and is dimensioned to fit inside the cylindrical core 62. By way of example, in one configuration the magnetometer sensor 24 has a maximum horizontal dimension of around 4 cm and a maximum vertical dimension of around 4 cm (it will be appreciated that magnetometer sensor 24 may actually have a collateral housing that could be greater in size than the actual magnetometer sensor 24). However, the coil dimensions, cylindrical core shape, and magnetometer dimensions provided above are mere examples of one possible configuration.

Figure 2:
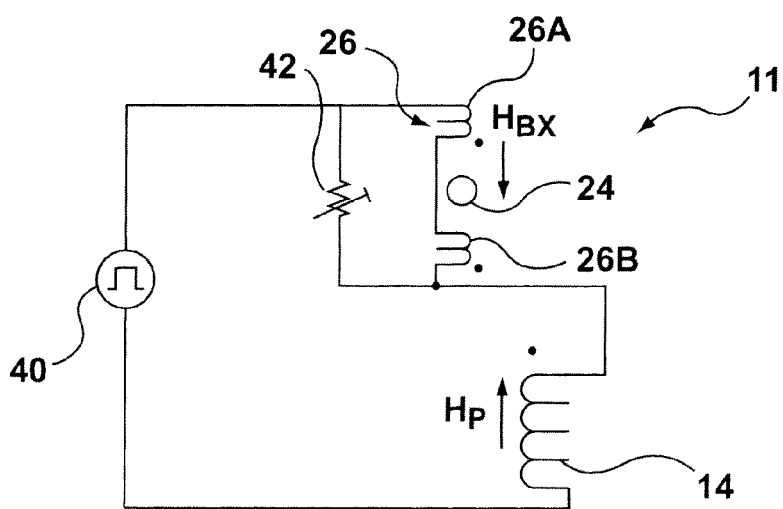
FIG. 2 is a circuit diagram of selected components of the combined sensor of FIG. 1.

FIG. 2 shows a schematic view of pulse transmitter circuitry 11 of the combined EM sensor and magnetometer device 10. As will be appreciated from the above description, the transmitter circuitry 11 includes in serial connection: a pulse generator 40 (which is part of the EM controller 12), the primary transmitter coil 14 and the compensation coil 26 (which includes the axially spaced coil sections 26a and 26B). A trimming control device 42 such as a potentiometer can be provided in parallel with the compensation coil 26 to calibrate the compensation coil 26 so that the coil sections 26A and 26B cancel out the transmitter coil 14 field at the location of the magnetometer sensor 24 (shown in FIG. 2 between the coil sections 26A and 26B). As noted above, in operation the compensation coil 26 produces a canceling magnetic field whose gradient in space at the centrally located magnetometer sensor 24 closely matches that of the active magnetic field produced by the EM transmitter coil 14. In one example embodiment, the pulse generator 40 generates a pulse waveform.

Figure 6A:
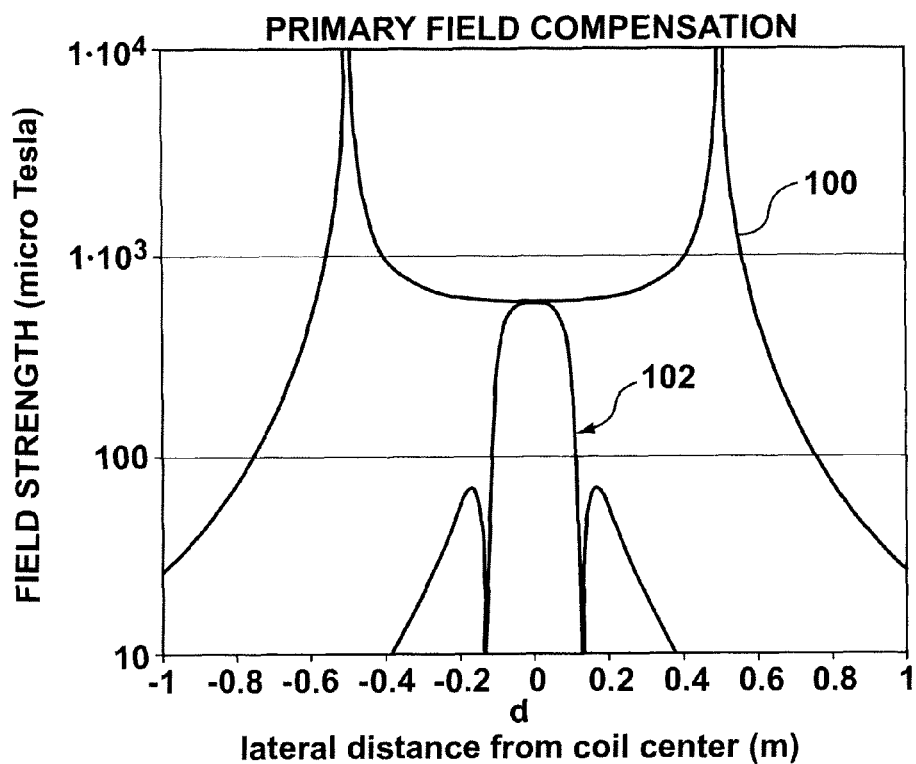
FIG. 6a is a graph showing the strength of overlapping magnetic fields at the location of magnetometer of the device of FIG. 1, varying by lateral displacement from the center of the magnetometer.
Figure 6B:
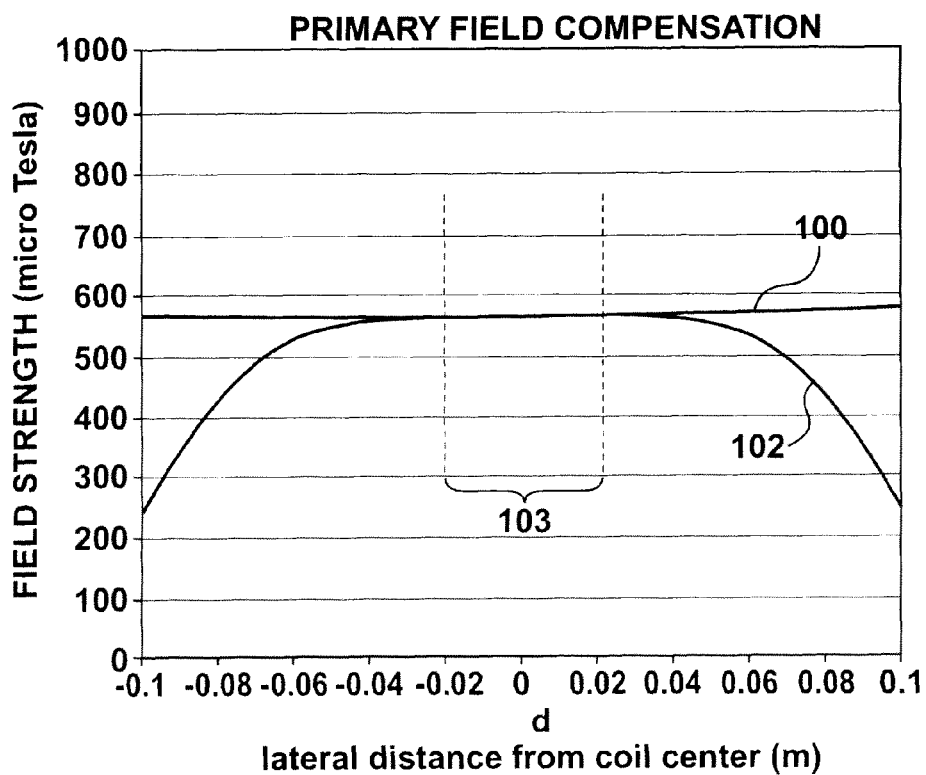

FIGS. 6A and 6B show an example plot of field strength to lateral distance from the common center point of the primary transmitter coil 14 and the compensation coil 26, with line 100 representing the field strength of the primary transmitter coil 14 and line 102 representing the field strength of the compensation coil 26. In the enlarged view of FIG. 6B, the lines 103 represent the largest horizontal dimension of the magnetometer sensor 24. As shown in FIG. 6B, the field strength lines 100 and 102 are substantially identical across the width of the magnetometer sensor 24 such that the field of the primary transmitter coil 14 can be substantially cancelled by the compensation coil across the width of the magnetometer sensor 24.

Figure 7A:
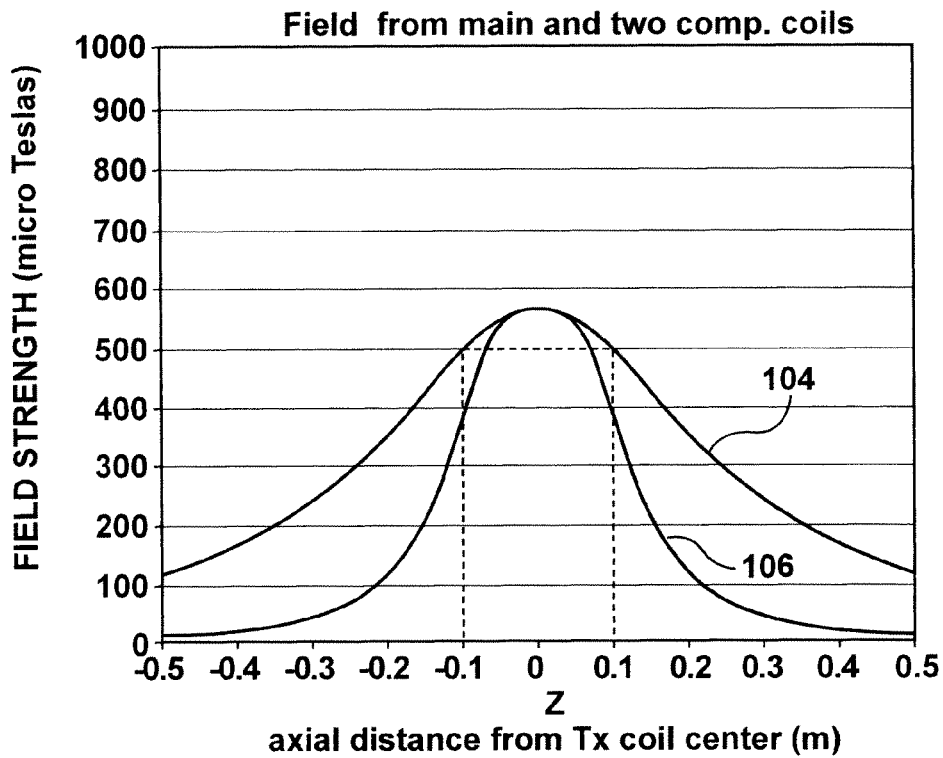
FIG. 7a is a graph showing the strength of overlapping magnetic fields at the location of magnetometer of the device of FIG. 1, varying by axial displacement from the center of the magnetometer.
Figure 7B:
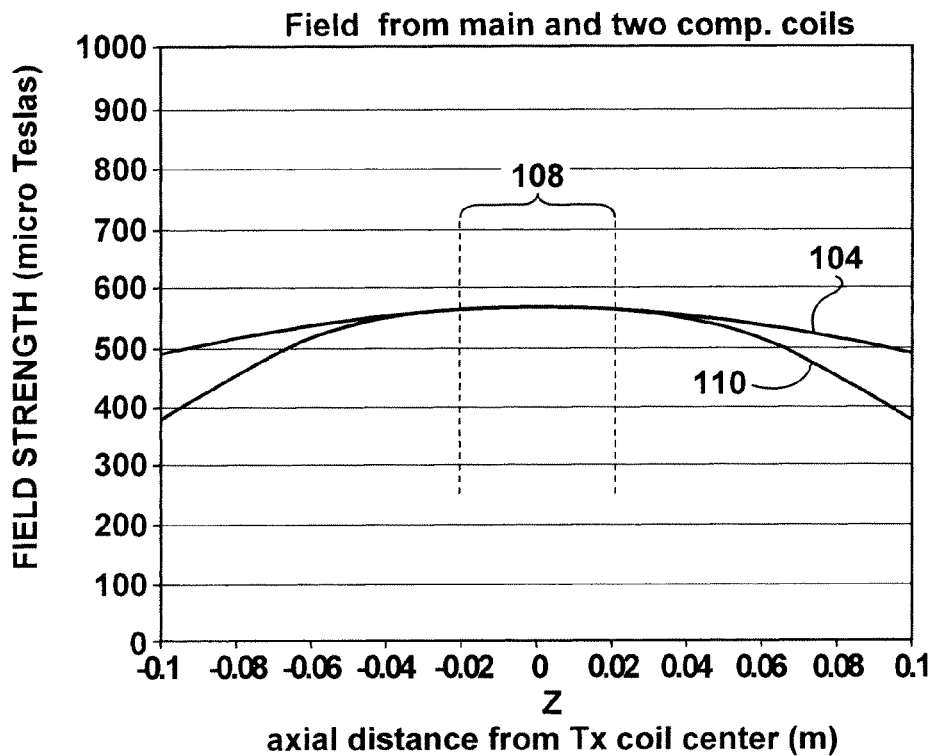

FIGS. 7A and 7B show an example plot of field strength to axial distance from the center point of the primary transmitter coil 14 and the compensation coil 26 (which is between coils 26A and 26B in the embodiment of FIGS. 4 and 5), with line 104 representing the field strength of the primary transmitter coil 14 and line 106 representing the field strength of the compensation coil 26. In the enlarged view of FIG. 7B, the lines 108 represent the largest vertical dimension of the magnetometer sensor 24. As shown in FIG. 7B, the field strength lines 104 and 106 are substantially identical across the height of the magnetometer sensor 24 such that the field of the primary transmitter coil 14 can be substantially cancelled by the compensation coil across the height of the magnetometer sensor 24. Thus, the field of the primary transmitter coil 14 is substantially cancelled by the compensation coil 26 across the entire active volume or region of the magnetometer sensor 24.

Although the primary transmitter coil 14 in the example embodiment comprises wire wrapped around a rectangular frame, it can be embodied in any of a number of different forms. Other embodiments may employ a frame with a non-rectangular shape, such as a circle or ellipse. The same is true of the induction sensor coil 16: alternate embodiments could employ any of a number of shapes for this coil. Some embodiments may not use a wire coil to accomplish the function of the transmitter coil 14 and compensation coil 26: rather alternative transmitter structures known in the art that can be sued to create magnetic fields with the properties necessary to implement an induction sensor and a compensation transmitter.

In at least some example embodiments, the compensation coil 26 may include more than two axially spaced coil sections. The various embodiments presented above are merely examples and are in no way meant to limit the scope of this disclosure. Variations of the innovations described herein will be apparent to persons of reasonable skill in the art, such variations being within the intended scope of the present application. In particular, features from one or more of the above-mentioned embodiments may be selected to create alternative embodiments comprising a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present application as a whole. The subject matter herein and in the recited claims intends to cover and embrace all suitable changes in technology.

The invention claimed is:

1. A combined electromagnetic and magnetometer detection system for detecting objects comprising:
   a primary electromagnetic transmitter for generating a primary magnetic field;
   an electromagnetic sensor for sensing secondary magnetic fields generated by a target region subjected to the primary magnetic field;
   a magnetometer sensor substantially centered at a center of the primary magnetic field;
   a compensation transmitter for generating a compensating magnetic field that substantially negates the primary magnetic field across the magnetometer sensor; and
   a signal generator electrically connected to the primary electromagnetic transmitter and the compensation transmitter for driving the transmitters to generate the primary magnetic field and the compensating magnetic field, respectively.

2. The detection system of claim 1 wherein the primary electromagnetic transmitter comprises a transmitter coil having a transmitter coil central dipole axis and the compensation transmitter comprises a compensation coil having a compensation coil central dipole axis that extends substantially along the transmitter coil central dipole axis, the magnetometer sensor being substantially centered on the transmitter coil central dipole axis.

3. The detection system of claim 2 wherein the compensation coil includes first and second compensation coil sections that are axially spaced from each other along the compensation coil central dipole axis, the magnetometer sensor being substantially centered between the first and second compensation coil sections.

4. The detection system of claim 3 wherein the first and second compensation coil sections are serially connected with the primary transmitter coil.

5. The detection system of claim 4 wherein a trimming control device is connected in parallel with the first and second compensation coil sections for calibrating the operation thereof.

6. The detection system of claim 2 wherein the electromagnetic sensor comprises a receiver coil that has a dipole axis that extends substantially along the transmitter coil central dipole axis.

7. The detection system of claim 6 wherein the primary electromagnetic transmitter, electromagnetic sensor, magnetometer sensor, and compensation transmitter are each mounted to a common rigid support structure.

8. The detection system of claim 6 wherein the rigid support structure is supported on wheels.

9. The detection system of claim 1 wherein the compensating magnetic field substantially negates the primary magnetic field across an entire volume of the magnetometer sensor.

10. The detection system of claim 1 including a controller for processing signals received through the electromagnetic sensor and the magnetometer sensor.

11. A combined electromagnetic and magnetometer detection system for detecting objects comprising:
a primary transmitter coil for generating a primary magnetic field, the primary transmitter coil having a central primary transmitter coil dipole axis;
a sensor coil for sensing secondary magnetic fields generated by target regions subjected to the primary magnetic field;
a magnetometer sensor substantially centered on the primary transmitter coil dipole axis;
a compensation coil for generating a compensating magnetic field that substantially negates the primary magnetic field across the magnetometer sensor, the compensation coil being smaller than the primary transmitter coil and having a central compensation coil dipole axis extending substantially along the primary transmitter coil dipole axis; and
a signal generator electrically connected to the primary transmitter coil and the compensation coil for driving the coils to generate the primary magnetic field and the compensating magnetic field, respectively.

12. The detection system of claim 11 wherein the compensation coil includes first and second compensation coil sections that are axially spaced from each other along the compensation coil dipole axis, the magnetometer sensor being substantially centered between the first and second compensation coil sections.

13. The detection system of claim 12 wherein the first and second compensation coil sections are serially connected with the primary coil.

14. The detection system of claim 11 including a controller for processing signals received through the sensor coil and the magnetometer sensor.

15. The detection system of claim 11 wherein the sensor coil is substantially parallel to the primary coil and has a dipole axis that extends substantially along the primary transmitter coil dipole axis.

16. The detection system of claim 11 wherein the compensating magnetic field substantially negates the primary magnetic field across an entire volume of the magnetometer sensor.

17. A method for detecting unexploded ordinance comprising:
providing a detection system that includes: (i) a primary coil for generating a primary magnetic field, the primary coil having a central primary coil dipole axis; (ii) a sensor coil for sensing secondary magnetic fields generated by target regions subjected to the primary magnetic field; (iii) a magnetometer sensor substantially centered on the primary coil dipole axis; and (iv) a compensation coil for generating a compensating magnetic field that substantially negates the primary magnetic field across the magnetometer sensor, the compensation coil being smaller than the primary coil and having a central compensation coil dipole axis extending substantially along the primary coil dipole axis;
generating a pulsed signal to drive the primary coil and the secondary to produce the primary magnetic field and the compensating magnetic field, respectively;
measuring, through the sensor coil, secondary magnetic field information generated by a target region subjected to the primary magnetic field;
measuring, through the magnetometer sensor, magnetic field information in the target region; and
processing the measured information to detect unexploded ordinance in the target region.

18. The method of claim 17 wherein the compensation coil includes first and second compensation coil sections that are axially spaced from each other along the compensation coil dipole axis, the magnetometer sensor being substantially centered between the first and second compensation coil sections.

* * * * *